(12) United States Patent
Caillaud et al.

(10) Patent No.: US 9,766,091 B2
(45) Date of Patent: Sep. 19, 2017

(54) METHOD AND SYSTEM FOR DETERMINING THE COMPATIBILITY OF AN ANGULAR GUIDANCE WITH AN APPROACH

(71) Applicant: THALES, Courbevoie (FR)

(72) Inventors: Christophe Caillaud, Blagnac (FR); Jérôme Sacle, Tournefeuille (FR)

(73) Assignee: Thales, Courbevoie (FR)

( * ) Notice: Subject to any disclaimer, the term of this patent is extended or adjusted under 35 U.S.C. 154(b) by 282 days.

(21) Appl. No.: 14/622,683

(22) Filed: Feb. 13, 2015

(65) Prior Publication Data

US 2016/0356626 A1    Dec. 8, 2016

(30) Foreign Application Priority Data

Feb. 14, 2014  (FR) ..................................... 14 00403

(51) Int. Cl.
| | |
|---|---|
| G01C 23/00 | (2006.01) |
| G08G 5/02 | (2006.01) |
| G05D 1/06 | (2006.01) |
| G08G 5/00 | (2006.01) |

(52) U.S. Cl.
CPC ......... G01C 23/005 (2013.01); G05D 1/0676 (2013.01); G08G 5/0021 (2013.01); G08G 5/02 (2013.01); G08G 5/025 (2013.01)

(58) Field of Classification Search
CPC ............................... G01C 23/005; G08G 5/02
USPC .................. 701/16, 18, 11, 14, 3, 8, 532, 5; 244/183, 196; 342/33; 340/947, 951
See application file for complete search history.

(56) References Cited

U.S. PATENT DOCUMENTS

| | | | |
|---|---|---|---|
| 6,856,864 B1* | 2/2005 | Gibbs | G06F 3/0237 701/14 |
| 8,121,747 B2 | 2/2012 | Loots et al. | |
| 2007/0145183 A1 | 6/2007 | Baudry | |
| 2008/0140270 A1 | 6/2008 | Davis et al. | |
| 2008/0319591 A1* | 12/2008 | Markiton | G01C 23/00 701/14 |
| 2009/0024261 A1 | 1/2009 | Rouquette et al. | |
| 2009/0024269 A1* | 1/2009 | Shorten | G01M 1/122 701/31.4 |
| 2011/0184595 A1* | 7/2011 | Albert | G08G 5/025 701/16 |
| 2013/0245861 A1 | 9/2013 | Putz et al. | |
| 2013/0245862 A1 | 9/2013 | Putz et al. | |

FOREIGN PATENT DOCUMENTS

| | | |
|---|---|---|
| FR | 2897712 A1 | 8/2007 |
| FR | 2988201 A1 | 9/2013 |
| FR | 2988202 A1 | 9/2013 |

* cited by examiner

Primary Examiner — Marthe Marc-Coleman
(74) Attorney, Agent, or Firm — Baker Hostetler LLP

(57) ABSTRACT

A method and system is provided for determining the compatibility of an approach, to a landing runway, with an angular guidance mode, the approach being compatible with a linear guidance mode, the angular guidance being characterized by a lateral angle of precision, the linear guidance being characterized by a lateral divergence of precision. The method is implemented on a flight management system deployed aboard an aircraft and comprising a first step of determining a first distance representative of a maximum distance of use of the angular guidance, on the basis of the lateral angle of precision and of the lateral divergence of precision.

16 Claims, 3 Drawing Sheets

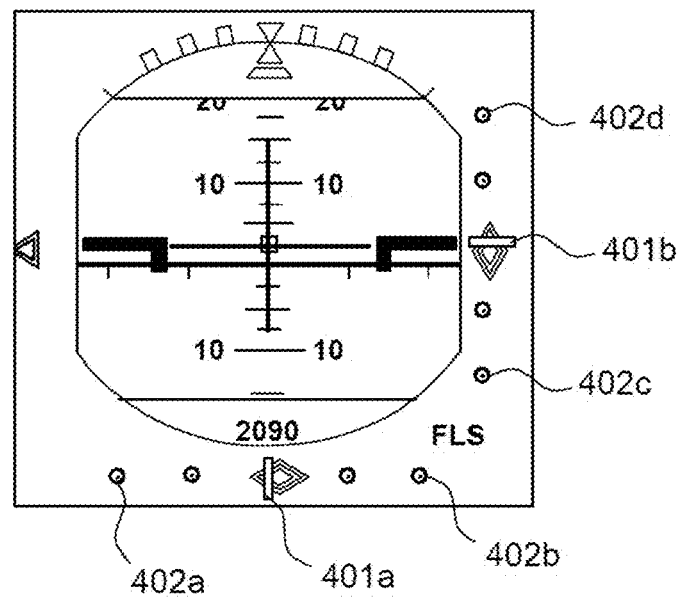
FIG.4
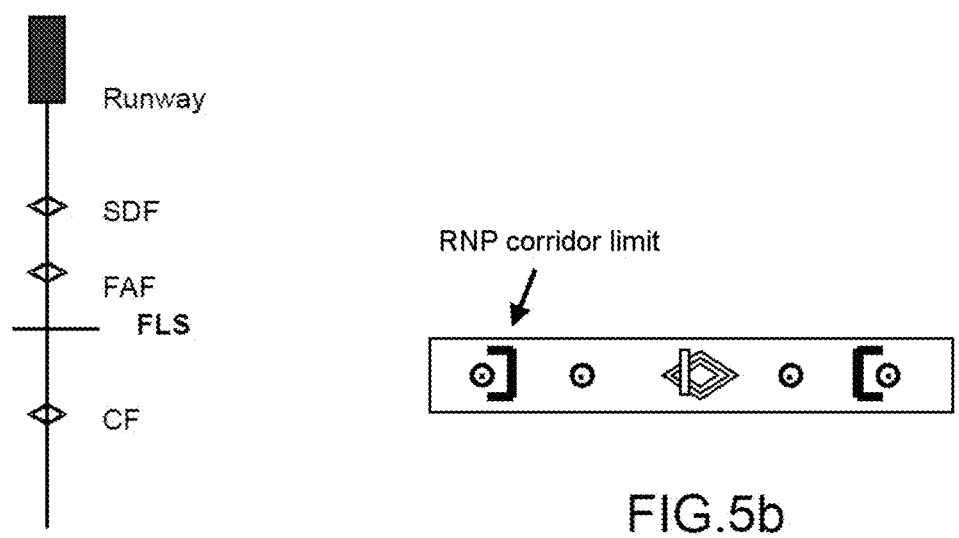
FIG.5a
FIG.5b

METHOD AND SYSTEM FOR DETERMINING THE COMPATIBILITY OF AN ANGULAR GUIDANCE WITH AN APPROACH

CROSS-REFERENCE TO RELATED APPLICATION

This application claims priority to foreign French patent application No. FR 1400403, filed on Feb. 14, 2014, the disclosure of which is incorporated by reference in its entirety.

FIELD OF THE INVENTION

The invention lies in the field of flight management systems (also known by the acronym "FMS").

BACKGROUND

Two modes of guidance for conducting a non-precision approach to an airport are known. The first mode is the angular mode. In this mode the aircraft must remain in a cone or pyramid whose vertex is the end of the runway in general and whose aperture is defined by an angle of precision. This first mode is also known by the acronym "FLS" for "FMS Landing System". The second mode of approach is a geometric segment linear mode in which the aircraft must fly in a corridor centred on the landing runway in general and whose width depends on the precision necessary for landing.

In airports, non-precision approaches are carried out as a function of this linear mode. Thus if the pilot wishes to use an angular mode on approach, it is necessary to determine whether the use of this mode is compatible with the precision requirement of the approach in order to be compatible with the obstacles along the approach.

It is known in the prior art to leave it up to the crew to be responsible for using an angular guidance mode on an approach scheduled to be flown using a linear guidance mode. To aid their judgment the FMS represents the axis which will serve for the lateral guidance mode on the navigation screen and, when the aeroplane is provided with a vertical display, the axis which will serve for the vertical guidance mode. The divergences in trajectories are evaluated with the aid of deviation indicators.

When the angular guidance mode is used, the divergences along the approach are evaluated with the aid of indicators of angular deviation in place of the linear deviations. This prevents the crew from pinpointing the deviation in terms of linear divergence and this may lead the crew not to use the angular mode, although it is designed to improve the safety of the approach by its naturally convergent behaviour, comparable to that of ILS (acronym standing for Instrument Landing System).

It is also known to exclude a certain number of procedures of the angular guidance mode. This exclusion is carried out when the segments constituting the approach are not aligned with the last segment of the approach procedure. This is for example presented in the Honeywell patent U.S. Pat. No. 8,121,747B2. Whereas this scheme precludes the pilot from using an angular guidance mode on certain approaches that are manifestly incompatible therewith, it does not guarantee, however, that the approaches, which the patent permits, comply with the constraints of obstacles. Thus the crew remains in doubt as regards the relevance of using an angular guidance mode during an approach scheduled to use a linear guidance mode.

Also, approaches with a high requirement for precision, termed "RNP-AR" for Required Navigation Performance, are not eligible in the initially angular mode.

SUMMARY OF THE INVENTION

The invention is aimed at alleviating the problems cited above by proposing a method of determination of the compatibility of the angular guidance mode for an approach initially scheduled in linear guidance mode. The invention also makes it possible to fly with approaches having high requirements in respect of precision by using an angular guidance mode.

For this purpose, the subject of the invention is a method of determination of the compatibility of an approach, to a landing runway, with an angular guidance mode, the said approach being compatible with a linear guidance mode, the said angular guidance being characterized by a lateral angle of precision, the said linear guidance being characterized by a lateral divergence of precision, the said method being implemented on a flight management system deployed aboard an aircraft and comprising:
  a first step of determining a first distance representative of a maximum distance of use of the said angular guidance, on the basis of the said lateral angle of precision and of the said lateral divergence of precision.

Advantageously the linear guidance is furthermore characterized by a vertical divergence of precision, and the said angular guidance is furthermore characterized by a vertical angle of precision,
  the said first determining step being furthermore adapted for the determination of a second distance representative of a maximum distance of use of the said angular guidance, on the basis of the said vertical angle of precision and of the said vertical divergence of precision.

Advantageously the method of determination comprises:
  a second step of determining a separation distance between the said aircraft and the start of the said landing runway or between the said aircraft and a point situated in front of the said landing runway and representing the end of the said approach,
  a third step of determining the possibility of using the said angular approach by comparing between the said separation distance and the said first distance.

Advantageously the third determining step being furthermore adapted for determining the possibility of using the said angular approach by comparing between the said separation distance and the said second distance.

Advantageously the first step uses the relation:

$$d = \frac{RNP}{\tan \alpha}$$

in this relation d corresponds to the said first distance, RNP to the said lateral divergence of precision and α to the said lateral angle of precision.

Advantageously the first step uses the relation:

$$d_{vert} = \frac{\beta}{\tan \alpha_{vert}}$$

in this relation $d_{haut}$ corresponds to the said second distance, β to the said vertical divergence of precision and $\alpha_{haut}$ to the said vertical angle of precision.

Advantageously the method of determination comprises:
- a fourth step of determining a lateral angle of precision to be complied with, associated with the said angular guidance, and on the basis of the said separation distance and of the said lateral divergence of precision, and/or
- a vertical angle of precision to be complied with, associated with the said angular guidance, and on the basis of the said separation distance and of the said vertical divergence of precision.

Advantageously the fourth determining step is adapted for the use of the formula:

$$\gamma = \tan^{-1}\left(\frac{RNP}{dist}\right)$$

in this formula γ represents the said lateral angle of precision to be complied with, RNP the said lateral divergence of precision and dist the said separation distance
and/or of the formula:

$$\gamma_{vert} = \tan^{-1}\left(\frac{\beta}{dist}\right)$$

in this formula $\gamma_{vert}$ represents the vertical angle of precision to be complied with, β the vertical divergence of precision and dist the separation distance.

The subject of the invention is also a method for selecting an approach trajectory to an airport or to an aerodrome, implemented on a flight management system deployed aboard an aircraft, the said method comprising the following steps:
- a first step of receiving an item of information representative of a landing airport or aerodrome selected by the pilot,
- a second step of determining for the said landing airport or aerodrome all or some of the possible approach trajectories, associated with a landing runway, on the basis of a database of the airports or aerodromes,
- a third step of determining, for at least one of the possible approaches, whether the said approach is compatible with an angular guidance mode, by geometric analysis of the approach, by use of the method described above,
- a fourth step of display (of all the said possible approaches for the said airport or the said landing aerodrome display, for the approaches analysed, of the compatibility with the said angular guidance mode,
- a fifth step of receiving an item of information representative of one of the displayed approaches which has been selected,
- a sixth step of parametrizing the said flight management system so as to use the selected approach.

Advantageously the sixth step of parametrization is furthermore adapted for deselecting the angular guidance mode, if the aircraft leaves a flight plan compatible with the angular guidance mode and for indicating to the pilot that the new flight plan is incompatible with the angular guidance mode.

The subject of the invention is also a system for determining the possibility, for an aircraft, of using an angular guidance mode approach characterized by a lateral angle of angular precision to carry out an approach to a landing runway characterized by a required lateral divergence of precision comprising:
- a flight management system deployed aboard an aircraft and suitable for the implementation of the steps of the method described above.

Advantageously the determining system comprises a visual user interface exchanging information with the said management system and allowing the display:
- of an indicator representative of a lateral angular deviation of the aircraft with respect to the said lateral angle of precision,
- of an indicator representative of a vertical angular deviation of the aircraft with respect to the said vertical angle of precision,
- of four indicators representative respectively of a maximum permitted deviation of the aircraft to the left, to the right, downwards, the said maximum permitted deviations corresponding to the said lateral angle of precision or to the said lateral angle of precision limited by a margin.

Advantageously the determining system furthermore comprises;
- a navigation database comprising the description of the set of possible approaches for the various aerodromes or airports that the aircraft can use
- a formatting tool comprising at least one processor adapted for the determination, for the said landing airport or aerodrome, of all or some of the possible approach trajectories, associated with a landing runway, on the basis of the said database of the airports or aerodromes the said processor comprising a storage zone for storing the computed data
- the said visual user interface being furthermore adapted for exchanging information with the processor and allowing;
  - the selection by the pilot of an airport or aerodrome
  - the display of the possible approaches for the selected aerodrome or airport with for each approach an indication of the compatibility with an angular guidance mode
  - the selection by the pilot of one of the approaches;
- the said processor configuring the said flight management system as a function of the said selected approach the said management system being moreover suitable for the implementation of the steps of the method described above.

Advantageously the determining system furthermore comprises:
- a formatting tool, implemented outside of the flight management system and adapted for determining, for some of the possible approaches for some of the airports or aerodrome that the aircraft can use, whether the said approaches are compatible with an angular guidance mode;
- moreover the system comprises downloading means allowing the downloading of data representative of the compatibility of the approaches with the angular guidance mode, between the formatting tool and the navigation database.

Advantageously the formatting tool is situated on the ground and is furthermore adapted for determining, for some of the possible approaches for some of the airports or aerodrome of a geographical zone, whether the said approaches are compatible with an angular guidance mode; moreover the system comprises transmission means allowing the transmission of data representative of the compatibility of the approaches with the angular guidance mode, between the formatting tool and the flight management system.

BRIEF DESCRIPTION OF THE DRAWINGS

The invention will be better understood and other advantages will become apparent on reading the detailed description given by way of nonlimiting example and with the aid of the figures among which:

FIG. 4 which presents an embodiment of the display of angular deviations;

FIG. 5.a which presents an interface on the head-up navigation display;

FIG. 5.b which presents the linear and angular lateral deviation scale;

DETAILED DESCRIPTION

The method according to the invention allows the determination, by an item of aeronautical equipment situated on the ground or aboard the aircraft, of the geometric criteria of the approach making it possible to determine which portion of the approach is compatible with an angular guidance.

This determination is carried out by projecting the lateral angular precision "triangle" on the corridor of the linear approach around the approach and by verifying that the resulting zone is compatible with any altitude and slope constraints associated with the approach.

The item of aeronautical equipment suitable for the implementation of this method may be an "FMS" flight management system or a Navigation Database formatting tool.

Thus within the framework of a linear approach the latter is parametrized by a navigation precision. This navigation precision is also known by the expression RNP for Required Navigation performance and is generally equal to 0.3 Nm. In this case, the aircraft must, in accordance with regulations, have the capacity to evolve according to its total error, in a 0.3 Nm corridor centred on the approach axis according to a 95% probability. This regulatory information relating to linear approach procedures is contained within the AMC 20-27 regulatory framework.

In order that the angular guidance be compatible with the linear guidance it is necessary that the trajectory of the angular guidance lie within the corridor of the linear guidance. In two dimensions this implies that the triangle representing the angular approach is included in the rectangle representing the linear approach.

Figure 1:
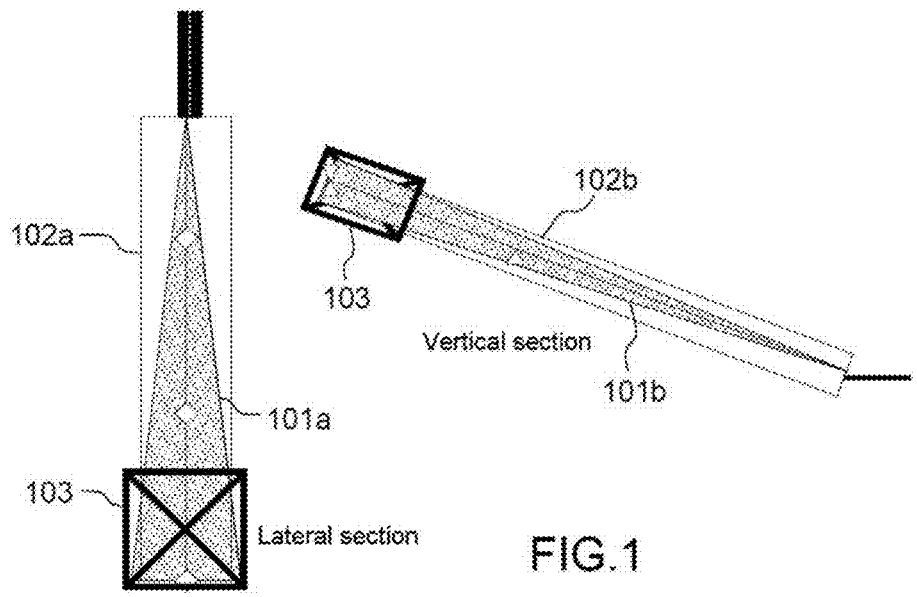
FIG. 1 which presents an approach with the zone defined by the angular guidance and the zone defined by the linear guidance.

It also is possible to effect an extension in three dimensions of the compatibility. Thus, based on FIG. 1, this involves determining, in lateral section, the location of an angular triangle of precision 101.a of the angular approach with respect to a rectangle 102.a of precision of the linear approach. Likewise it is necessary, in vertical section, to determine the location of an angular triangle of precision 101.b of the angular approach with respect to a rectangle 102.b of precision of the linear approach. Thus by combining the lateral section with the vertical section a precision pyramid of the angular approach is obtained which must lie within a parallelepiped of precision of the linear approach.

Moreover in this figure the barred rectangle 103 represents the zone in which the angular guidance cannot be used since it does not allow sufficient precision with respect to the linear precision requirement called the "RNP" (Required Navigation Performance).

Figure 2:
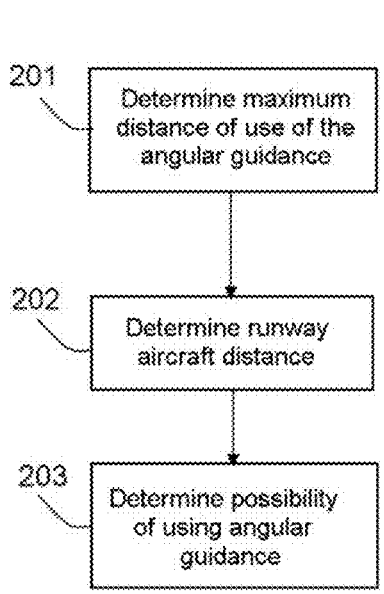
FIG. 2 which presents the method according to the invention.

FIG. 2 presents the method of this invention. This method makes it possible to determine whether an angular guidance mode, characterized by a lateral angle of angular precision, can be used to carry out an approach to a landing runway scheduled to use a linear guidance mode, characterized by a lateral divergence of precision. This method comprises:

a first step 201 of determining a first distance representative of a maximum distance of use of the said angular guidance, on the basis of the said lateral angle of precision and of the said lateral divergence of precision.

In one embodiment the linear guidance is furthermore characterized by a vertical divergence of precision, and the angular guidance is furthermore characterized by a vertical angle of precision. Moreover the first step 201 is adapted for the determination of a second distance representative of a maximum distance of use of the said angular guidance, on the basis of the said vertical angle of precision and of the said vertical divergence of precision.

In one embodiment the method furthermore comprises:

a second step 202 of determining a separation distance between the aircraft and the start of the said landing runway, and a third step 203 of determining the possibility of using the angular guidance mode by comparing between the said separation distance and the said first distance.

In one embodiment the separation distance can correspond to a distance between the aircraft and a point situated in front of the runway and representing the end of the approach procedure.

Moreover in another embodiment the third determining step 203 is furthermore adapted for determining the possibility of using the angular guidance mode by comparing between the separation distance and the second distance.

In these two embodiments the angular guidance mode is usable if the second distance and the first distance are greater than the separation distance.

In one embodiment the first determining step 201 is adapted for using the formula:

$$d = \frac{RNP}{\tan \alpha}$$

In this formula RNP corresponds to the said lateral divergence of precision, d to the first distance and α to the said lateral angle of precision.

Stated otherwise, by virtue of this method, it is possible to determine whether an angular guidance mode (FLS) satisfies the lateral divergence of precision of a linear guidance mode.

Moreover in an embodiment it is possible to consider a margin to be taken with respect to this lateral divergence of precision. In this case the lateral divergence of precision is expressed as RNP-ϵ, where the term "ϵ" may in particular represent a lateral error divergence for the tracking of the segment of the approach.

By way of example, it is possible to take a value of RNP of 0.3 Nm and to take a value of ϵ equal to 0.05 Nm. In this case the lateral divergence of precision then has a value equal to 0.25 Nm.

In one embodiment the first determining step 201 is adapted for using the formula:

$$d_{vert} = \frac{\beta}{\tan \alpha_{vert}}$$

in this relation $d_{vert}$ corresponds to the second distance, $\beta$ to the vertical divergence of precision and $\alpha_{vert}$ to the vertical angle of precision.

Stated otherwise, from the vertical standpoint, on the basis of the descent plan arising from the database and used to construct the geometric or angular profile, the function considers the permitted vertical divergence of precision. The regulatory framework authorizes a vertical divergence of precision ($\beta$) of 75 feet beyond which the pilot must not continue the approach if he is not under visual conditions.

Moreover in a variant, it is possible to consider a margin to be taken with respect to this vertical divergence of precision. In this case the vertical divergence of precision is expressed as $\beta-\delta$, where the term "$\delta$" may in particular represent a vertical error divergence for the tracking of the segment of the approach.

By way of example, it is possible to take a value of $\beta$ of 75 feet and to take a value of $\delta$ equal to 10 feet. In this case the vertical divergence of precision then has a value equal to 65 feet.

Figure 3:
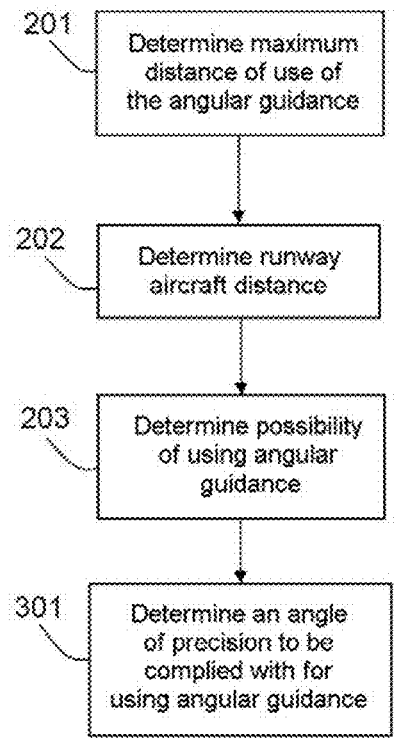
FIG. 3 which presents another embodiment of the method according to the invention.

In another embodiment presented in FIG. 3 the method comprises a fourth determining step 301 for determining a lateral angle of precision to be complied with, on the basis of the separation distance of the lateral divergence of precision.

This lateral angle of precision to be complied with corresponds to a lateral angle of precision that the angular approach must have in order to remain in a corridor corresponding to the linear approach.

In one embodiment the fourth determining step can be carried out by using the formula:

$$\gamma = \tan^{-1}\left(\frac{RNP}{dist}\right)$$

In this equation $\gamma$ represents the lateral angle of precision to be complied with, RNP the lateral divergence of precision and dist the separation distance. This second angle $\gamma$ represents the lateral angle of precision that must be complied with by an aircraft situated at dist from a landing runway to carry out an angular approach, to comply with linear constraints of associated approach.

In one embodiment dist can correspond to a distance between the aircraft and a point situated in front of the runway and representing the end of the approach procedure.

In one embodiment the fourth determining step is adapted furthermore for the determination of a vertical angle of precision to be complied with, on the basis of the separation distance of the vertical divergence of precision.

This vertical angle of precision to be complied with can be obtained using the formula:

$$\gamma_{vert} = \tan^{-1}\left(\frac{\beta}{dist}\right)$$

In this equation $\gamma_{vert}$ represents the angle of vertical precision to be complied with, $\beta$ the vertical divergence of precision and dist the separation distance.

This angle of vertical precision to be complied with, $\gamma_{vert}$ represents the vertical angle of precision that must be complied with by an aircraft situated at dist from a landing runway to carry out an angular approach, on a landing runway parametrized to comply with linear constraints.

Moreover, in an embodiment the method can comprise a step of displaying this angle of lateral precision to be complied with, and/or this angle of vertical precision to be complied with, on an item of equipment of the aircraft. Thus this angle of lateral precision to be complied with, and/or of this angle of vertical precision to be complied with can then be displayed on an item of equipment of the aircraft so as to allow the pilot to view the lateral or vertical angle of precision that must be complied with by the aircraft.

The angle $\gamma_{vert}$ makes it possible to view the maximum linear deviation allowed by equivalence to its translation in terms of angular deviation.

The display step may be carried out using a representation such as presented in FIG. 4. In order to represent the lateral or vertical angle of precision, it is possible to use a coded procedure. This procedure allows the association between an angular deviation scale and the deviation in degrees represented by the lateral or vertical angle of precision. The maximum lateral or vertical angular deviation of the aircraft, which allows it to remain in the linear guidance corridor, is then represented by a bound. This makes it possible to interrelate the approaches by linear guidance and the approaches by angular guidance.

When the aircraft is situated in the angular guidance pyramid, the indicators 401.a and 401.b which represent the angular deviations of the aircraft are situated between the points (402.a, 402.b, 402.c and 402.d) representing the maximum permitted deviation of the aircraft. It is known in the prior art to indicate that these points are situated at two points, "2 dots".

Thus according to the slope arising from the coded approach procedure, the vertical angular deviation scale associates a deviation in degrees, for example it is possible to take as reference that 2 dots in vertical corresponds to a maximum vertical angular deviation of 0.72°.

In lateral, likewise an angular correspondence with the dots is effected. The width of the beam depends on its definition of the angular guidance mode, for example it is possible to take as reference that 2 dots corresponds to a maximum lateral angular deviation of 2°.

These lateral and vertical precisions will be used to determine the correspondence between an angular deviation and a linear deviation so as to make the two guidance modes, angular (FLS) and linear (RNP), coincide.

In FIG. 4 if it is considered that the maximum deviation is situated at "two dots" then it is not possible, for the pilot, to determine when the lateral (respectively vertical) deviation indicator is situated at the level of these 2 dots, if the aircraft is at the limit of the angular guidance pyramid or if it has already passed beyond this angular guidance pyramid. Indeed when the lateral (vertical) deviation indicator abuts the "2 dots" bound, then, by construction of the piloting screen, the lateral (or vertical) deviation indicator cannot pass beyond the "2 dots" bound.

In order to counter this limitation it is possible in an embodiment not to consider the 2-dots bound as being the position of the maximum angular deviation but to take a margin of the order of 20%, i.e. 1.8 dots and consider it to be the maximum value of the maximum angular deviation.

In this case 1.8 dots lateral corresponds to a lateral angle of angular precision of 1.8° and 1.8 dots vertical corresponds to a vertical angle of angular precision of 0.57°.

Thus the method establishes a correspondence between the differentiable maximum angular divergence and the geometric maximum tolerance with the margin, seen above, i.e. for lateral RNP—$\epsilon$, and for vertical $\beta$–$\delta$. The possible zone of application of the angular guidance mode (FLS) considering the linear-guidance precision (RNP) complied with is applicable up to the distance where the lateral angle of angular precision and the vertical angle of angular precision encounter the precision RNP-$\epsilon$ and $\beta$–$\delta$. The distances are respectively the lateral and vertical distances.

In another embodiment the display step is carried out in the manner presented in FIG. 5.$a$ and 5.$b$.

FIG. 5.$a$ presents an interface "ND", for "navigation display", delimiting the point, named FLS in this figure, where the angular guidance mode can be used. This distance is the most constraining between the first distance and the second distance. The lateral angular guidance mode can be used before the vertical angular guidance mode or at the same time.

The points SDF, FAF and CF represent characteristic points along the final approach.

In FIG. 5.$b$ it is possible to envisage representing at one and the same time the linear divergences relating to the linear guidance procedure and the angular divergences relating to the angular guidance procedure. Thus it is possible to determine whether the precision of the angular approach matches the precision required by the linear approach. This precision matches when the diamond, representing the angular divergence, is situated inside the limits of the linear guidance.

Figure 6:
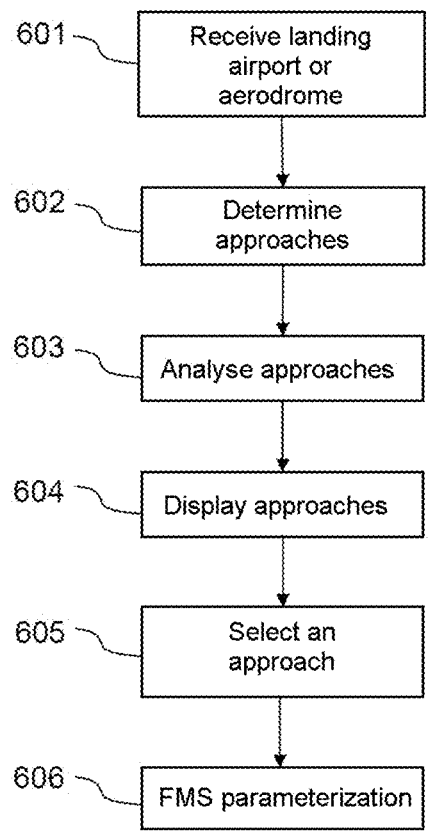
FIG. 6 which presents a mode of implementation of the method of the invention.

FIG. 6 presents a mode of use of the method described in FIG. 2.

This mode of use makes it possible to facilitate the choice of an approach by the pilot. Indeed when a pilot wishes to land at an airport, it is not obvious for him to know which approach modes (linear or angular) he will be able to use as a function of the flight conditions. This mode of use allows him to ascertain the approaches, to an airport, that are achievable with angular guidance.

This mode of use comprises the following steps:

A first step 601 of reception, by the flight management system, of the item of information relating to the landing airport or aerodrome. This item of information represents the airport or the aerodrome that which the pilot wishes to land, and it is transmitted by the pilot.

A second step 602 of determining for the landing airport or aerodrome all or some of the possible approach trajectories, associated with a landing runway, on the basis of a database of the airports or aerodromes. This step is carried out by the flight management system.

A third step 603 of determining, for at least one of the possible approaches, whether the approach is compatible with an angular guidance mode, by geometric analysis of the approach. This step is carried out by the flight management system via a geometric analysis of the approach according to the method in FIG. 2.

A fourth step of display 604 of the set of possible approaches for the landing airport or aerodrome, for the approaches analysed, of the compatibility with the angular guidance mode.

A fifth step of receiving 605 an item of information representative of one of the displayed approaches which has been selected.

A sixth step of parametrization 606 of the flight management system so as to use the selected approach.

In one embodiment the sixth step of parametrization 606 is furthermore adapted for deselecting the angular guidance mode, if the aircraft leaves a flight plan compatible with the angular guidance mode and for indicating to the pilot that the new flight plan is incompatible with the angular guidance mode.

Figure 7:
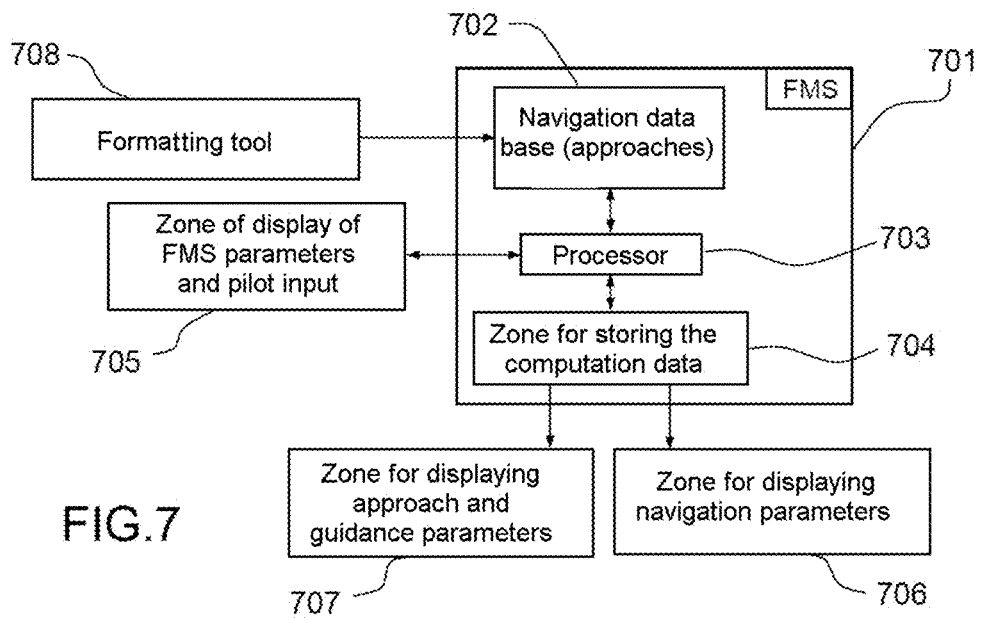
FIG. 7 presents a system allowing the implementation of the method of the invention.

FIG. 7 presents a system allowing the implementation of the method of the invention. This method is implemented in one or more flight management systems 701 which include a navigation database 702. This database comprises the description of the set of possible approaches for the various aerodromes or airports that the aircraft can use. The possible approaches are referenced in a navigation database associated with an airport. For example a given airport has a runway that can be used in both directions moreover each runway receives a designator making it possible to identify it for example RW10, RW28. Moreover the possible approach schemes (ILS, VOR (for "VHF Omnidirectional Range" which is a radioelectric positioning system) and RNAV/GNSS (non-precision instrument approach procedure based on the worldwide satellite navigation system)) are indicated for each runway, the database then contains a designator making it possible to identify the approach used by a runway and consisting of the concatenation of the indication of the approach and of the designator of the runway for example ILS RW10, ILS RW28, VOR RW10, VOR RW28, RNAV RW10, RNAV RW28. The flight management system or systems also comprise a processor 703 in charge of various computations and of zones 704 for storing or saving the computed data. The system also comprises a visual user interface 705. This user interface allows;

the selection by the pilot of an airport or aerodrome the display of the possible approaches for the selected aerodrome or airport with for each approach an indication of the compatibility with an angular guidance mode the selection by the pilot of one of the approaches.

This interface can therefore consist of a display zone presenting the data received from the flight management system or systems and allowing the inputting of the parameters of the pilot destined for the flight management system or systems. Moreover the visual interface comprises a display zone for the data relating to navigation 706, a display zone for the data relating to approach and to guidance 707 and a display zone for the data relating to the main piloting parameters.

In the first mode of implementation the pilot indicates to the flight management system, via the user interface, the destination aerodrome or airport in the flight plan. Thereafter the step of determining for the airport all or some of the approach trajectories is carried out by the processor 703 of the flight management system.

Thereafter an analysis step for all or some of the approaches makes it possible to verify the compatibility with the angular guidance mode. The flight management system performs a sort on the approaches to be analysed by discarding the precision approaches which have their own angular guidance means. The precision approaches have a label indicating ILS, IGS, GLS, MLS. ILS signifies "Instrument Landing System". ILS is the most precise radionavigation means used for landing. IGS is an instrument landing system. GLS signifies "GPS Landing System". MLS signifies "Microwave Landing System" this other approach technology uses a beacon emitting on a frequency span other than that used by a system of ILS type. The flight management system also discards the non-precision approaches marked LOC, BC, LDA, which can be categorized as precision approaches. This step is carried out by the processor 603 and the results are stored in the zone 704 for storing the computation data. The processor searches for whether the approach procedure undergoing analysis comprises one of the following criteria:

- the final flight segment according to the A424 standard is of RF (radius to fix) type,
- the angle between the runway axis and the flight segment is greater than a value lying in an interval ranging from 45° to 55° with as preferential value 50°.
- the approach procedure requires a navigation performance lower than a value included in the interval ranging from 0.25 to 0.1,
- the magnetic declination is not known. Indeed if the magnetic declination is not known then it is not possible to compute a magnetic orientation from the geographical orientation. And therefore an angular guidance lateral beam cannot be constructed from an origin point in proximity to the runway.
- the landing runway is not known or defined in the airports or aerodromes database inserted into the flight management system
- the ILS frequency is adjusted manually in alternative mode (NAV) on the basis of the systems for adjusting radionavigation frequencies. This indicates that the pilot wishes to carry out a precision approach manually without taking account of the approaches database.
- there is an incompatibility between the computed slope of the angular guidance and the descent profile of the approach inserted or loaded into the flight plan of the flight management system. This happens when along a distance D, taken from the origin point of the angular guidance beam, the vertical profile of the angular guidance is situated below the approach profile of the procedure. By way of example, it is considered that D equals 20 Nm or that this distance is determined from the position of the point IAF (initial approach point of the procedure).

If the approach procedure does not include any of these characteristics, the processor associates with the procedure an identifier indicating that the angular guidance is possible. If the procedure includes at least one of the characteristics, the processor associates with the procedure an identifier indicating that the approach is of LNAV/VNAV type (these terms are known in the prior art and signify Lateral Navigation and Vertical Navigation respectively).

The processor repeats the compatibility verification step on the set of non-precision approach procedures associated with the airport or with the aerodrome, and stores the identifiers determined. However, so as not to needlessly overload the memory associated with the controller, the storage of the item of information representative of compatibility with an angular guidance mode is erased when the aerodrome or the airport initially considered is no longer used either in the active flight plan, or in the secondary flight plan.

When the pilot selects the display of the various approaches associated with the airport or with the aerodrome, on the active flight plan or on the secondary flight plan, the processor displays for each labelled non-precision approach the stored associated identifier. The displaying of this identifier is carried out on the graphical interface 605 or 607 viewed by the pilot.

Moreover when the pilot selects a non-precision approach from the list, if the approach possesses an identifier indicating that the angular guidance is possible, a possibility of deactivating the angular guidance mode is displayed to the pilot. If the identifier indicates that the approach is of LNAV/VNAV type, no other indication is displayed to the pilot.

When the pilot selects a non-precision approach from the list:

- if the approach possesses an identifier indicating that the angular guidance is possible, the processor selects the angular guidance mode to carry out this approach.
- if the approach possesses an identifier indicating that the angular guidance is possible, but that pilot deactivates the angular guidance mode, the processor selects the LNAV/VNAV guidance mode to carry out this approach.
- if the approach possesses an identifier indicating that the approach is of LNAV/VNAV type, the processor selects the LNAV/VNAV guidance mode to carry out this approach.

The solution therefore makes it possible to display to the pilot, for each approach, whether this approach is compatible with the angular criteria. This compatibility analysis is carried out, without waiting for the pilot to select the approach. This makes it possible in particular to avoid contradicting the initial choice of the approach mode associated with an approach.

Once the approach has been selected, the waypoints and the manoeuvres making it possible to pass through them are stored in the flight plan of the flight management system. Moreover the system computes the parameters necessary for the angular guidance with an automatic pilot when the crew engages the approach guidance mode.

In a second embodiment the implementation of a part of the method is offloaded from the flight management system to a formatting tool 708 of the navigation database. This formatting tool is for example a database server making it possible to generate a navigation database on the basis of the ARINC 424 format. Thus the second determining step is no longer implemented on the flight management system but it is implemented on a ground computer. It is therefore the ground computer which determines, according to the criteria set forth hereinafter (including the geometric criterion), whether an approach is compatible with an angular guidance mode. The ground computer carries out, for each of the aerodromes/airports of the database, verification of compatibility of the runways of this airport or aerodrome, and then updates the initial navigation database with this additional item of information indicating which mode of guidance is usable for the approach. This new navigation database is loaded into the flight management system according to the usual schemes for loading databases. When the pilot selects the approaches page for a given airport the flight management system has the role of presenting the information of the database transcribing that such and such an approach is achievable using a procedure of angular guidance type. The flight management system also has the role of applying the choice of approach mode that the pilot selects.

Thus in this second mode of implementation of the method, subsequent to the initial step of reception by a pilot of the item of information relating to the landing airport or aerodrome, the processor extracts, from the navigation database, for each aerodrome or airport, the non-precision approaches associated therewith.

This database has been previously filled by the formatting tool. The latter has carried out an analysis step, which makes it possible to determine for each approach to the airports or aerodromes that the aircraft can use whether this approach is compatible with an angular guidance mode, by geometric analysis of the approach. In particular the formatting tool searches for whether the procedure comprises one of the following criteria:

the final flight segment according to the A424 standard is of RF (radius to fix) type, the angle between the runway axis and the approach axis is greater than a value lying in an interval ranging from 45° to 55° with as preferential value 50°.

the approach procedure requires a navigation performance lower than a value lying in the interval ranging from 0.25 to 0.1, the magnetic declination is not known. Indeed if the magnetic declination is not known then it is not possible to compute a magnetic orientation from the geographical orientation. And therefore an angular guidance lateral beam cannot be constructed from an origin point in proximity to the runway.

there is an incompatibility between the computed slope of the angular guidance and the descent profile of the approach inserted or loaded into the flight plan of the flight management system. This happens when along a distance D, taken from the origin point of the angular guidance beam, the vertical profile of the angular guidance is situated below the approach profile of the procedure. By way of example it is considered that D equals 20 Nm or that this distance is determined from the position of the point IAF (initial approach point of the procedure).

If the procedure does not include any of these characteristics, the tool associates with the procedure an identifier indicating that it is possible to use an angular guidance. If the procedure includes at least one of the characteristics, the tool associates with the procedure an identifier indicating that it is possible to use an LNAV/VNAV approach.

The tool repeats the compatibility verification step for the set of approach procedures associated with an airport or aerodrome and indicates for each approach whether it is possible to use an approach of angular guidance type or an LNAV/VNAV approach. Thereafter the database, comprising all this information, is loaded into the flight management system or into some other item of equipment for example an item of equipment known by the acronym EFB for "Electronic Flight Bag".

On the basis of the insertion of the destination aerodrome or airport into the active flight plan or into secondary flight plan, the pilot selects the arrival page to view the various approaches to the aerodrome or the airport, the processor displays for each non-precision approach previously labelled FLS/FAPP the corresponding identifier on the interface in view of the pilot.

Subsequent to the step of displaying to the pilots all the approaches associated with the airport and for the analysed approaches the compatibility with the angular guidance mode and when the pilot selects a non-precision approach from the list, if the approach makes it possible to use an approach of angular guidance type, a possibility of deactivating the angular guidance is displayed to the pilot. If the approach is of LNAV/VNAV type, no other display is presented on the pilot's interface screen.

When the pilot selects a non-precision approach from the list:

if the approach possesses an identifier indicating that the angular guidance is possible, the processor selects the angular guidance mode to carry out this approach.

if the approach possesses an identifier indicating that the angular guidance is possible, but that pilot deactivates the angular guidance mode, the processor selects the LNAV/VNAV guidance mode to carry out this approach.

if the approach possesses an identifier indicating that the approach is of LNAV/VNAV type, the processor selects the LNAV/VNAV guidance mode to carry out this approach.

The solution always proposes an achievable mode for a non-precision approach before its insertion into the flight plan, without waiting for the selection by the approach to analyse and potentially contradict the initial choice of the approach mode referring thereto.

Once the approach has been selected, the waypoints and the manoeuvres making it possible to pass through them are stored in the flight plan of the flight management system.

The invention claimed is:

1. A method of determination of a compatibility of a non-precision approach, to a landing runway, with an angular guidance mode, the non-precision approach being compatible with a linear guidance mode, the angular guidance being characterized by a lateral angle of precision, the linear guidance being characterized by a lateral divergence of precision, the method being implemented on a flight management system deployed aboard an aircraft and comprising:

a first step of determining with the flight management system a first distance representative of a maximum distance of use of the angular guidance, on a basis of the lateral angle of precision and of the lateral divergence of precision, the flight management system including a navigation database, a processor, and a visual user interface, a second step of determining with the flight management system a separation distance between the aircraft and a start of the landing runway or between the aircraft and a point situated in front of the landing runway and representing an end of the approach, and a third step of determining with the flight management system a possibility of using the angular approach by comparing the separation distance and the first distance.

2. The method of determination according to claim 1, in which the linear guidance is furthermore characterized by a vertical divergence of precision, and the angular guidance is furthermore characterized by a vertical angle of precision, wherein the first determining step further includes determination of a second distance representative of a maximum distance of use of the angular guidance, on a basis of the vertical angle of precision and of the vertical divergence of precision.

3. The method of determination according to claim 2, in which the third determining step further includes determining a possibility of using the angular approach by comparing the separation distance and the second distance.

4. The method of determination according to claim 3, in which:

the first step uses the relation:

$$d_{vert} = \frac{\beta}{\tan \alpha_{vert}}$$

in this relation $d_{haut}$ corresponds to the second distance, $\beta$ to the vertical divergence of precision and $\alpha_{haut}$ to the vertical angle of precision.

5. The method of determination according to claim 4, in which a margin $\delta$ is taken with respect to the vertical divergence of precision β which is replaced with a vertical divergence of precision of value equal to β−δ.

6. The method of determination according to claim 2, comprising:
a fourth determining step of determining a lateral angle of precision to be complied with, associated with the angular guidance, and on a basis of the separation distance and of the lateral divergence of precision, and/or a vertical angle of precision to be complied with, associated with the angular guidance, and on a basis of the separation distance and of the vertical divergence of precision.

7. The method of determination according to claim 6, in which:
the fourth determining step further comprises use of the formula:

$$\gamma = \tan^{-1}\left(\frac{RNP}{dist}\right)$$

in this formula γ represents the lateral angle of precision to be complied with, RNP the lateral divergence of precision and dist the separation distance and/or of the formula:

$$\gamma_{vert} = \tan^{-1}\left(\frac{\beta}{dist}\right)$$

in this formula $\gamma_{vert}$ represents the vertical angle of precision to be complied with, β the vertical divergence of precision and dist the separation distance.

8. The method of determination according to claim 1, in which:
the first step uses the relation:

$$d = \frac{RNP}{\tan\alpha}$$

in this relation d corresponds to the first distance, RNP to the lateral divergence of precision, and α to the lateral angle of precision.

9. The method of determination according to claim 8, in which a margin ε is taken with respect to the lateral divergence of precision RNP which is replaced with a lateral divergence of precision of value equal to RNP−ε.

10. A method for selecting an approach trajectory to an airport or to an aerodrome with a flight management system deployed aboard an aircraft, the method comprising the following steps:
a first reception step of receiving with the flight management system an item of information representative of a landing airport or aerodrome selected by a pilot, the flight management system including a navigation database, a processor, and a visual user interface,
a second step of determining for the landing airport or aerodrome all or some possible approach trajectories, associated with a landing runway, on a basis of the navigation database of airports or aerodromes,
a third step of determining with the flight management system, for at least one of the possible approach trajectories, whether the approach is compatible with an angular guidance mode, by geometric analysis of the approach, by determining a first distance representative of a maximum distance of use of the angular guidance, on a basis of the lateral angle of precision and of the lateral divergence of precision,
a fourth step of display of a set of the possible approaches for the airport or the landing aerodrome, for the approaches analysed, of the compatibility with the angular guidance mode,
a fifth reception step of receiving with the flight management system an item of information representative of one of the displayed approaches which has been selected, and
a sixth step of parametrization with the flight management system of the flight management system so as to use a selected approach.

11. The method according to claim 10, in which the sixth step of parametrization further comprises deselecting the angular guidance mode, if the aircraft leaves a flight plan compatible with the angular guidance mode and for indicating to the pilot that a new flight plan is incompatible with the angular guidance mode.

12. A determination system for determining the possibility, for an aircraft, of using an angular guidance approach mode characterized by a lateral angle of angular precision to carry out an approach to a landing runway characterized by a required lateral divergence of precision comprising:
a flight management system deployed aboard an aircraft, the flight management system configured to determine a first distance representative of a maximum distance of use of the angular guidance, on a basis of the lateral angle of precision and of the lateral divergence of precision, and
the flight management system including a navigation database, a processor, and a modifiable visual user interface.

13. The determination system according to claim 12 comprising
the modifiable visual user interface exchanging information with the management system and allowing the display:
of an indicator representative of a lateral angular deviation of the aircraft with respect to the lateral angle of precision,
of an indicator representative of a vertical angular deviation of the aircraft with respect to the vertical angle of precision,
of four indicators representative respectively of a maximum permitted deviation of the aircraft to the left, to the right, downwards, the maximum permitted deviations corresponding to the lateral angle of precision or to the lateral angle of precision limited by a margin.

14. The determination system according to claim 12, further comprising:
a formatting tool, implemented outside of the flight management system and configured for determining, for some of the possible approaches for some of the airports or aerodrome that the aircraft can use, whether the approaches are compatible with an angular guidance mode;
moreover the system comprises a downloading device configured to allow a downloading of data representative of the compatibility of the approaches with the angular guidance mode, between the formatting tool and the navigation database.

15. The determination system according to claim 14, in which the formatting tool is situated on the ground and is furthermore configured for determining, for some of the possible approaches for some of the airports or aerodrome of a geographical zone, whether the approaches are compatible with an angular guidance mode;

wherein the system comprises a transmission device configured to transmit data representative of the compatibility of the approaches with the angular guidance mode, between the formatting tool and the flight management system.

16. The determination system for determining a possibility, for an aircraft, of using an angular guidance approach mode characterized by a lateral angle of angular precision to carry out an approach to a landing runway characterized by a required lateral divergence of precision comprising:

a flight management system deployed aboard an aircraft, the flight management system configured to determine a first distance representative of a maximum distance of use of the angular guidance, on a basis of the lateral angle of precision and of the lateral divergence of precision, determine a separation distance between the aircraft and a start of the landing runway or between the aircraft and a point situated in front of the landing runway and representing an end of the approach, determine a possibility of using the angular approach by comparing the separation distance and the first distance and determine a lateral angle of precision to be complied with, associated with the angular guidance, and on a basis of the separation distance and of the lateral divergence of precision, and/or a vertical angle of precision to be complied with, associated with the angular guidance, and on a basis of the separation distance and of the vertical divergence of precision;

a navigation database comprising a description of a set of possible approaches for the aerodromes or airports that the aircraft can use;

a formatting tool comprising at least one processor configured for the determination, for the landing airport or aerodrome, of all or some of the possible approach trajectories, associated with a landing runway, on a basis of the navigation database of the airports or aerodromes, the at least one processor comprising a storage zone for storing computed data;

a visual user interface being furthermore configured for exchanging information with the processor and allowing:

a selection by a pilot of an airport or aerodrome;

a display of the possible approaches for a selected aerodrome or airport with for each approach an indication of the compatibility with an angular guidance mode; and a selection by the pilot of one of the approaches; and the processor configuring the flight management system as a function of the selected approach.

* * * * *